United States Patent
Kandekar et al.

(10) Patent No.: US 8,126,985 B1
(45) Date of Patent: Feb. 28, 2012

(54) PRIORITIZING VIRTUAL OBJECT DOWNLOADS IN A DISTRIBUTED VIRTUAL ENVIRONMENT

(75) Inventors: Kunal Kandekar, Morrisville, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 355 days.

(21) Appl. No.: 12/347,179

(22) Filed: Dec. 31, 2008

(51) Int. Cl.
*G06F 15/16* (2006.01)

(52) U.S. Cl. ........ 709/217; 709/204; 709/205; 709/207; 709/218; 709/219; 709/226; 345/418; 345/420

(58) Field of Classification Search .................. 709/204, 709/205, 207, 217, 218, 219, 226; 345/418, 345/420
See application file for complete search history.

(56) References Cited

U.S. PATENT DOCUMENTS

| | | |
|---|---|---|
| 5,109,483 A | 4/1992 | Baratz et al. |
| 6,329,986 B1 | 12/2001 | Cheng |
| 6,746,332 B1 | 6/2004 | Ing et al. |
| 6,767,287 B1 | 7/2004 | Mequaid et al. |
| 6,912,565 B1 | 6/2005 | Powers et al. |
| 6,951,516 B1 | 10/2005 | Eguchi et al. |
| 7,065,553 B1 | 6/2006 | Chesley et al. |
| 7,133,368 B2 | 11/2006 | Zhang et al. |
| 7,181,690 B1 | 2/2007 | Leahy et al. |
| 7,245,620 B2 | 7/2007 | Shankar |
| 7,269,632 B2 | 9/2007 | Edeker et al. |
| 7,388,585 B2 | 6/2008 | Kristiansen |
| 7,421,708 B2 | 9/2008 | Vass et al. |
| 7,493,558 B2 | 2/2009 | Leahy et al. |
| 7,512,071 B2 | 3/2009 | Goldschmidt et al. |
| 7,685,224 B2 | 3/2010 | Nye |
| 7,688,761 B2 | 3/2010 | Paramaguru |
| 7,814,153 B2 | 10/2010 | Flesch et al. |
| 7,814,154 B1 | 10/2010 | Kandekar et al. |
| 7,831,707 B2 | 11/2010 | Bardsley |
| 7,843,876 B2 | 11/2010 | Holt et al. |
| 2001/0052008 A1 | 12/2001 | Jacobus |
| 2002/0188678 A1 | 12/2002 | Edecker et al. |
| 2003/0177187 A1 | 9/2003 | Levine et al. |

(Continued)

FOREIGN PATENT DOCUMENTS

WO W003/081447 A1 10/2003

(Continued)

OTHER PUBLICATIONS

Bjorn Knutsson et al., "Peer-to-Peer Support for Massively Multiplayer Games," (article), Mar. 2004, 12 pages, in the 23rd Conference of the IEEE Communications Society (INFOCOM '04), Hong Kong, China.

(Continued)

*Primary Examiner* — Liangche A Wang
(74) *Attorney, Agent, or Firm* — Withrow & Terranova, PLLC (57) ABSTRACT

As a client connects to a peer in a distributed virtual environment, the peer provides the client with virtual objects that are relevant to the client so that the virtual objects can be rendered by the client and displayed to a user via a display device. In the distributed virtual environment, the client may require that each peer to which the client connects provide the client with virtual objects, referred to herein as content virtual objects, depicting a landscape of a region hosted by the peer. The client can render the content virtual objects on the display device for the user, depicting the region hosted by the respective peer.

22 Claims, 7 Drawing Sheets

U.S. PATENT DOCUMENTS

| | | | |
|---|---|---|---|
| 2005/0171997 A1 | 8/2005 | Seo et al. | |
| 2005/0203922 A1 | 9/2005 | Uhlir et al. | |
| 2006/0123127 A1 | 6/2006 | Littlefield | |
| 2007/0021110 A1* | 1/2007 | Chaudhri et al. | 455/418 |
| 2007/0186212 A1 | 8/2007 | Mazzaferri et al. | |
| 2007/0271301 A1 | 11/2007 | Klive | |
| 2007/0288598 A1 | 12/2007 | Edeker et al. | |
| 2008/0090659 A1 | 4/2008 | Aguilar et al. | |
| 2008/0201321 A1 | 8/2008 | Fitzpatrick et al. | |
| 2008/0207327 A1 | 8/2008 | Van Luchene et al. | |
| 2009/0172157 A1* | 7/2009 | Zhang | 709/224 |
| 2009/0319681 A1* | 12/2009 | Freelander et al. | 709/233 |
| 2010/0156899 A1* | 6/2010 | Bolger et al. | 345/420 |
| 2010/0306652 A1* | 12/2010 | Bolger et al. | 715/706 |

FOREIGN PATENT DOCUMENTS

WO     WO2007/124590 A1     11/2007

OTHER PUBLICATIONS

Jean-Sebastien Boulanger, "Comparing Interest Management Algorithms for Massively Multiplayer Games," (article), Oct. 30-31, 2006, Proceedings of 5th ACM SIGCOMM Workshop on Network and System Support for Games, Singapore.

Jouni Smed et al., "A Review on Networking and Multiplayer Computer Games," (article), Apr. 2002, pp. 30, Technical Report No. 454, Turku Centre for Computer Science.

No Author, Main Page—Solipsis, (website), obtained Feb. 6, 2007, 2 pages, http://solipsis.netofpeers.net/wiki2/index.php/Main_Page.

Mojtaba Hosseini et al., "Visibility-based Interest Management in Collaborative Virtual Environments," (article), Sep. 30-Oct. 2, 2002, pp. 143-144, Proceedings of the 4th international conference on Collaborative virtual environments, Bonn, Germany.

No Author, "Multiverse Technology: An Overview," (article), 2005, 12 pages, http://www.multiverse.net/platform/whitepapers/mv_overview.pdf.

Shun-Yun Hu et al., "Scalable Peer-to-Peer Networked Virtual Environment," (article), Aug. 2004, pp. 129-133, in Proc. 3rd ACM SIGCOMM 2004 workshops on NetGames '04.

Takuji Iimura et al., "Zoned Federation of Game Servers: a Peer-to-peer Approach to Scalable Multi-player Online Games," (article), Aug. 2004, pp. 116-120, in Proc. 3rd ACM SIGCOMM 2004 workshops on NetGames '04.

No Author, Uni-verse Home, (website), obtained Mar. 19, 2007, 4 pages, http://www.uni-verse.org/Uni-verse-Home.72.0.html.

Marcos Rates Crippa et al., "Peer-to-peer support for instance-based massively multiplayer games," (article), date unknown, 4 pages, http://www.inf.unisinos.br/~sbgames/anais/shortpapers/34739.pdf.

Shun-Yun Hu et al., "A Case for Peer-to-Peer 3D Streaming," (article), 2006, 8 pages, Ascend Technical Report (ASCEND-TR-002-2006A), http://ascend.sourceforge.net/docs/pub/ASCEND-TR-002-2006A.pdf.

Shun-Yun Hu et al., "A Case for 3D Streaming on Peer-to-Peer Networks," (article), Apr. 18-21, 2006, pp. 57-64, Proceedings of the Eleventh International Conference on 3D Web Technology, Columbia, Maryland, http://www.web3d.org/x3d/learn/web3d_2006/057-hu.pdf.

Shun-Yun Hu et al., "VON: A Scalable Peer-to-Peer Network for Virtual Environments," (article), Jul./Aug. 2006, pp. 22-31, vol. 20, issue 4, IEEE Network.

De Oliveira, Jauvane C. et al., "VELVET: An Adaptive Hybrid Architecture for VEry Large Virtual EnvironmenTs," (article), Dec. 2003, v. 12 No. 6, pp. 555-580.

Tanin, E. et al., "A Serverless 3D World," Proceedings of the 12th Annual ACM International Workshop on Geographic Information Systems, Nov. 12-13, 2004, ACM, New York, NY, 9 pages.

Schmalstieg, D. et al., "Sewing Worlds Together With SEAMS: a Mechanism to Construct Complex Virtual Environments," 1999, 16 pages.

Gehrmann, H., "P2P Based Distributed Virtual Reality. TerraPeer—a DVE Architecture and Implementation," Feb. 2004, Institute of Informatics and Mathematical Modeling, Technical University of Denmark (DTU), 200 pages.

Tanin, E. et al., "Building and Querying a P2P Virtual World," Geoinformatica, Mar. 2006, vol. 10, No. 1, Kluwer Academic Publishers, Hingham, MA, 22 pages.

* cited by examiner

PRIORITIZING VIRTUAL OBJECT DOWNLOADS IN A DISTRIBUTED VIRTUAL ENVIRONMENT

FIELD OF THE INVENTION

The present invention relates to virtual environments, and in particular to prioritizing virtual object downloads in a distributed virtual environment.

BACKGROUND OF THE INVENTION

Computer simulations, such as video games, that feature a virtual environment are increasingly popular. Such simulations typically feature a computer-generated landscape made up of content virtual objects that may represent an actual or an imaginary location in a past, present, or future time. Users are represented in the virtual environment by avatar virtual objects. Users control the avatars on the landscape through client software that runs on a computing device. An avatar can typically roam the landscape and interact with other users' avatars and with other computer-generated virtual objects. Different host computers control respective regions in the virtual environment. Interactions between avatars and other virtual objects result in message traffic between the client software controlling the avatar and a host that controls the respective region in which the interactions are occurring. As the avatar moves from one region to another, the responsibility for handling message traffic associated with the avatar may move from one host to another host. The existence of regions and the transitioning of client-host interactions may be transparent to the user.

A single entity typically creates the landscape virtual objects that define the landscape associated with a virtual environment. The landscape may be very detailed, and the graphics required to depict the landscape may be very large. The landscape virtual objects are usually downloaded and stored on the client computer as part of an installation process of the respective simulation before the user can participate in the virtual environment. While participating in the virtual environment, the landscape is rendered by client software and presented to the user on a display device. Preloading the landscape of the virtual environment on the client computer prior to game play allows the landscape to be rendered and presented to the user quickly, which would be difficult or impossible if the landscape virtual objects were being transferred over a network during game play.

Distributed virtual environments executing on hosts that are not under the control of a single entity are being considered. In such a virtual environment, entities that have no relationship with one another may host adjacent regions in the virtual environment. One problem with such a distributed virtual environment is that it will be difficult or impossible to preload the landscape of the entire virtual environment on the client computer prior to participating in the virtual environment because the landscape itself can change as hosts come online or go offline. Consequently, the landscape will typically be downloaded on an ad-hoc basis. Downloading the landscape virtual objects, which may be sizable, will compete with downloading other virtual environment information, such as messages and other types of virtual objects that are necessary to provide the user a realistic experience. Merely halting movement of an avatar until the landscape associated with a host has been transferred over the network to the client computer would result in significant delays for the user and would not lead to a satisfactory virtual environment experience. However, failure to provide sufficient landscape detail while enabling the avatar to interact with other virtual objects would likewise not provide a realistic virtual environment experience. Moreover, the order of providing virtual objects must be consistent from a realism perspective. For example, it would be unrealistic to display a bird virtual object sitting in a tree prior to displaying the tree virtual object. Thus, there is a need for a virtual object prioritization process for downloading virtual objects in a distributed virtual environment that properly balances available bandwidth with competing virtual object download requirements to provide a realistic virtual environment experience.

SUMMARY OF THE INVENTION

The present invention relates to prioritizing virtual object downloads in a distributed virtual environment. A peer hosts a region in the distributed virtual environment that may include a plurality of virtual objects, including content virtual objects, computer-generated virtual objects exhibiting artificial intelligence, and avatar virtual objects. A client associated with an avatar connects to the peer. An area of interest associated with the avatar is determined, and a plurality of virtual objects within or proximate to the area of interest are identified. A list of identified virtual objects is created and prioritized, and the peer initiates a download of at least two of the virtual objects to the client according to the prioritized list. The client renders the virtual objects for display on a display device associated with a user.

Criteria for prioritizing the virtual objects can include, for example, a type of virtual object, a distance of each of the plurality of virtual objects from the avatar, a significance of the plurality of virtual objects to the avatar, an area of interest associated with the plurality of virtual objects, and an estimated time of visibility of the plurality of virtual objects by the avatar. Prioritizing the download of the identified virtual objects ensures that the virtual environment is rendered in an order that provides a realistic experience for the user. The list of prioritized virtual objects can be prioritized by the client, by the peer, or by the client based on input provided by the peer. If the area of interest of the avatar associated with the client includes regions hosted by more than one peer, one peer may communicate with other peers to determine virtual objects within the area of interest and provide a consolidated list of virtual objects to the client. Alternately, the client can connect to the multiple peers, receive a list of virtual objects based on the area of interest from each peer, and consolidate the lists into a consolidated list.

A client has a finite network bandwidth. According to one embodiment of the present invention, an available download rate associated with the client is determined, a minimum transfer rate for each virtual object is determined, and relatively concurrent downloads for virtual objects are initiated so long as the cumulative minimum transfer rate of the virtual objects being downloaded remains less than the available download rate of the client.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
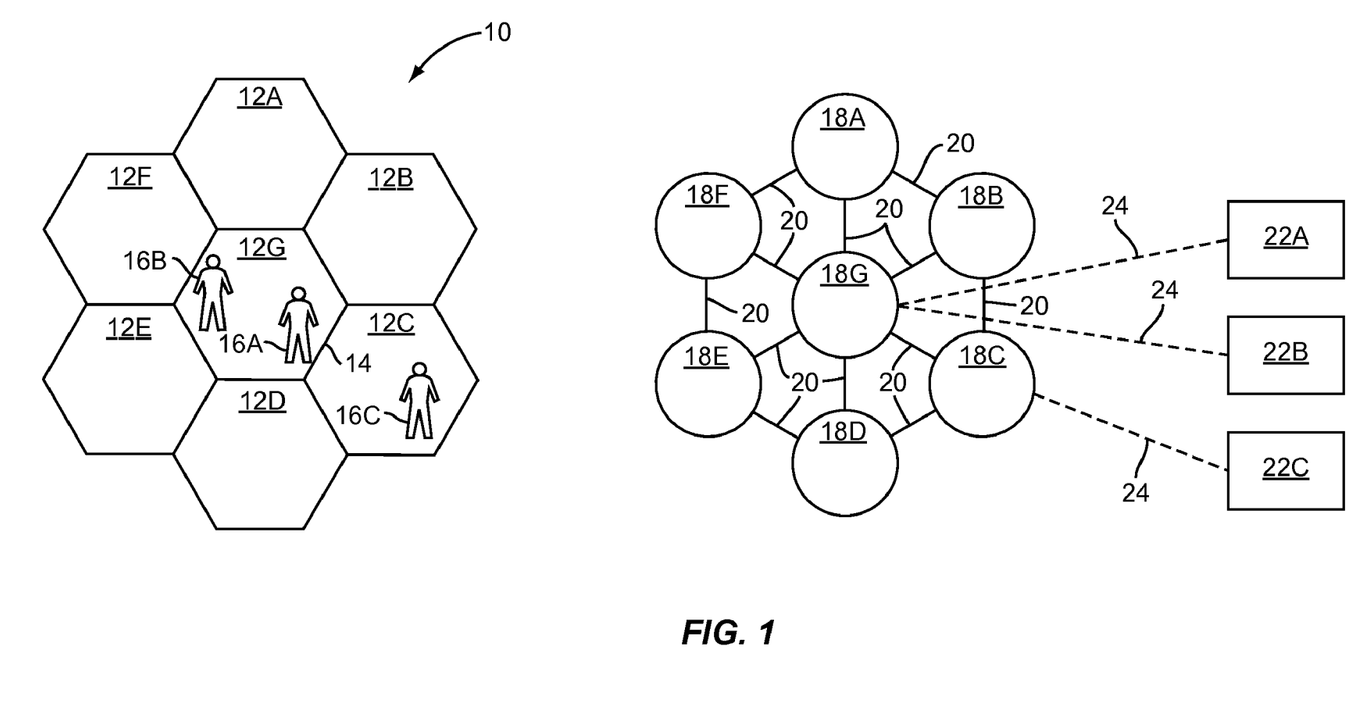
FIG. 1 is a schematic diagram illustrating a relationship between regions and peers in a virtual environment according to one embodiment of the present invention.

FIG. 1 is a schematic diagram illustrating a relationship between regions and peers in a virtual environment according to one embodiment of the present invention. A virtual environment 10 includes a plurality of regions 12A-12G. For the sake of brevity, the regions 12A-12G may be referred to herein singularly as the region 12 or collectively as the regions 12 where the discussion is not related to a specific region 12A-12G. Each of the regions 12 depicts a particular area within the virtual environment 10. While FIG. 1 shows eight regions 12 for purposes of illustration, the present invention is not limited to a particular number of regions 12. Likewise, while the regions 12 illustrated in FIG. 1 have a relatively uniform and hexagonal shape for purposes of illustration, the regions 12 according to the present invention can have any size or shape, and each region 12 can have a different size and shape from the other regions 12. Each region 12 is preferably contiguous with at least one other region 12, and thus shares a border 14 with an adjacent region 12. A two or three-dimensional landscape, or terrain, associated with each region 12 is made up of a plurality of content virtual objects. As is understood by those skilled in the art, a virtual object may comprise graphical content only, or may comprise graphical content as well as data and code that defines one or more behaviors associated with the virtual object.

One or more avatar virtual objects, such as avatars 16A-16C, roam the virtual environment 10. The avatars 16A-16C may be referred to herein singularly as an avatar 16 or collectively as avatars 16 where the discussion is not related to a specific avatar 16A-16C. An avatar 16 is a representation of a user and is controlled, via client software, by a respective user. Each region 12A-12G is hosted by a respective peer 18A-18G. The peers 18A-18G may be referred to herein singularly as a peer 18 or collectively as peers 18 where the discussion is not related to a specific peer 18A-18G. Each peer 18 is typically connected to another peer 18 hosting an adjacent region 12 via a peer connection 20. The peer connections 20 can comprise any suitable communications path suitable for enabling communications between the peers 18, including, for example, wired or wireless connections, and can be implemented in any combination of local area networks, wide area networks, or other types of networks. The peers 18 can use any suitable messaging protocol to communicate over the peer connections 20 including, for example, Transmission Control Protocol/Internet Protocol (TCP/IP). The peers 18 can comprise any suitable processing device sufficient to handle the functionality described herein. The peers 18 can comprise, for example, a general purpose computer, a cell phone, or a mobile gaming device running a Microsoft Windows or Linux operating system, and the functionality required to implement the peer 18 can comprise one or more software programs using a proprietary or conventional programming language, such as C, C++, or Java, for example.

Users control the avatars 16A-16C via client software, referred to herein as clients, such as clients 22A-22C. The clients 22A-22C may be referred to herein singularly as a client 22 or collectively as clients 22 where the discussion is not related to a specific client 22A-22C. The clients 22 have various responsibilities, including rendering the virtual objects in the virtual environment 10 for display to a respective user, manipulating an associated avatar 16 in accordance with the user's requests, initiating and terminating connections with one or more peers 18 as the respective avatar 16 moves from one region 12 to another region 12, and handling messages generated by virtual activity occurring in the virtual environment 10. The clients 22 can be implemented via a software program using a proprietary or conventional programming language that executes on a special or general purpose computing device, including a handheld gaming platform or a general purpose personal computer. Alternately, a portion or all of the functionality of the clients 22 can be implemented in an application-specific integrated circuit (ASIC) or firmware, as appropriate.

The clients 22 may have one or more connections, such as an event stream connection 24, with one or more peers 18 to which they are currently connected. The event stream connection 24 can be used to communicate messages relating to events from the client 22 to the respective peer 18, or vice versa. The peer 18 to which a client 22 is connected is typically determined by the location of the respective avatar 16. For example, as the avatar 16C approaches or crosses the border 14 separating the region 12G from the region 12C, the client 22C may initiate a connection with the peer 18G.

In conventional virtual environments, the content virtual objects that make up the landscape of the virtual environment are preloaded or pre-cached to a client, such as the client 22C, so that the client 22C has knowledge of the landscape associated with the region 12C. Assuming appropriate processing power of the underlying computing device, the client 22C is able to render the landscape of the region 12C relatively quickly for the respective user. However, the client 22C may not have knowledge of other virtual objects associated with the region 12C, including other avatars 16 in the region 12C, if any, and other computer-generated virtual objects in the region 12C. Thus, when the client 22C connects to the peer 18C, the peer 18C communicates, via messages, information to the client 22C and transfers to the client 22C virtual object data relating to avatars 16 and other virtual objects that may currently be in the region 12C. This information is in turn received by the client 22C and rendered for display to the respective user. All of this activity and the existence of the border 14 may be transparent to the respective user because the separation of the regions 12 may not be known to the user.

According to one embodiment of the present invention, the virtual environment 10 is a distributed virtual environment 10 and the peers 18 are not controlled by a single entity. The content virtual objects that make up the landscape of the regions 12 are not preloaded or pre-cached to the clients 22. Each peer 18 may be permitted to implement a respective region 12 as desired, so long as the peers 18 do so in compliance with certain specifications that may include network, messaging, or other requirements associated with the virtual environment 10 to ensure compatibility with other peers 18 and to ensure a client 22 can reliably connect and communicate with a peer 18 as necessary. In such a distributed virtual environment 10, it may be impossible to preload the content virtual objects on a client 22 because new peers 18 hosting newly created regions 12 may enter the virtual environment 10 at any time. Thus, the content virtual objects may be downloaded to the client 22 during game play. The phrase 'game play' will be used herein to describe the activity of a user participating in the virtual environment 10, whether the virtual environment 10 is associated with a game or other type of simulation.

Unfortunately, content virtual objects may be quite large depending on the detail and resolution of the respective region 12 with which the content virtual objects are associated. In addition, not only are the content virtual objects downloaded to the client 22, but other virtual objects, such as avatars 16 or computer-generated virtual objects, are also downloaded to the client 22 so such virtual objects can be rendered for the user. Depending on the bandwidth of the event stream connection 24 between the client 22 and the respective peer 18, downloading the content and other virtual objects associated with a region 12 may take a relatively long period of time. However, it is unsatisfactory to a user if there is a significant delay in game play each time a respective avatar 16 approaches or crosses a border 14.

Figure 2:
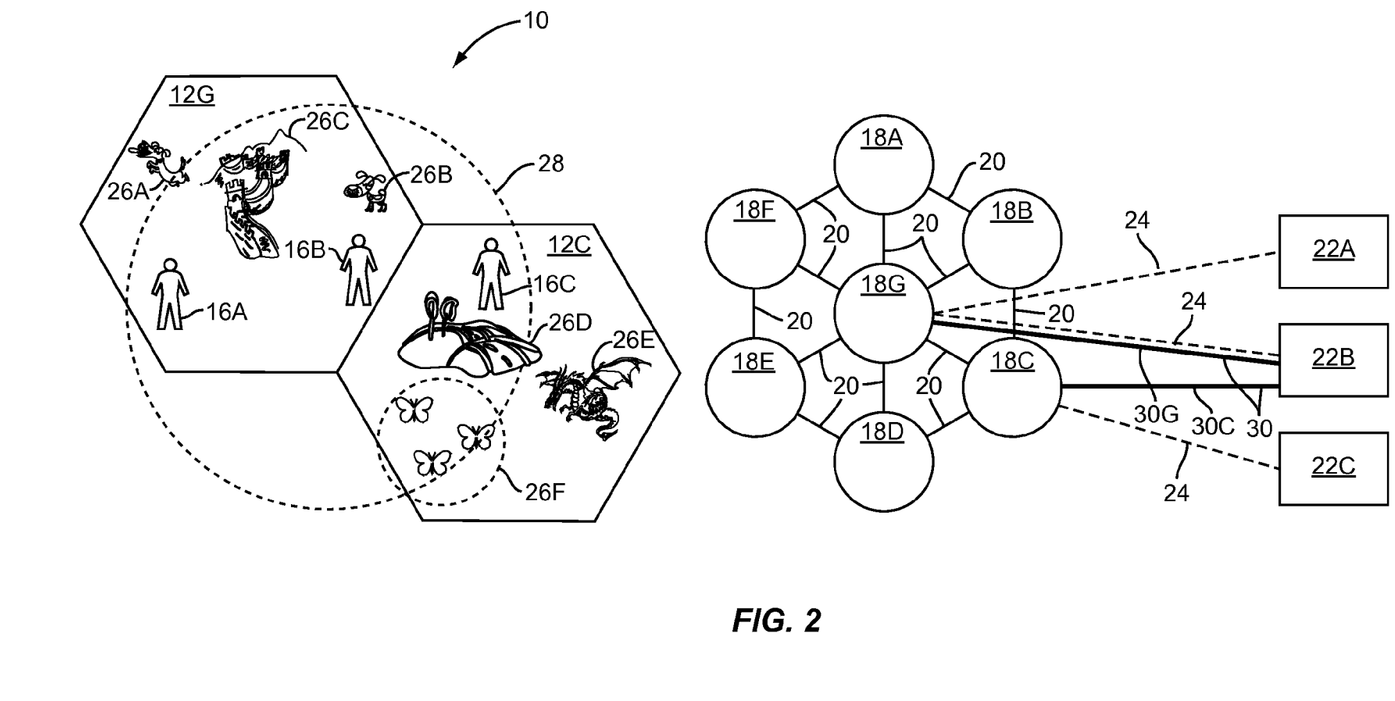
FIG. 2 is a schematic diagram illustrating a portion of the virtual environment illustrated in FIG. 1 in greater detail.

FIG. 2 is a schematic diagram illustrating a portion of the virtual environment 10 illustrated in FIG. 1. The avatars 16A and 16B are located in the region 12G, and the avatar 16C is located in the region 12C. A plurality of other virtual objects 26A-26F is present in the regions 12G and 12C. The virtual objects 26A-26F may be referred to herein singularly as a virtual object 26 or collectively as virtual objects 26 where the discussion is not related to a specific virtual object 26A-26F. Some of the virtual objects, such as the virtual objects 26C and 26D, are content virtual objects, and other virtual objects, such as the virtual objects 26A, 26B, 26E, and 26F, are computer-generated virtual objects that have dynamic behavior implemented via artificial intelligence modules executing on the respective peer 18. An area of interest 28 associated with the avatar 16B defines an area, or volume, about the avatar 16B that defines the extent to which a perception of the avatar 16B, such as sight, extends. More than one area of interest 28 may be associated with the avatar 16B. For purposes of illustration, the area of interest 28 is shown as a radius about the avatar 16B, but the area of interest 28 may be any size and shape, and is typically three dimensional. The shape and extent of the area of interest 28 may be based on any suitable factors, including sensory capabilities of the respective avatar 16B. Moreover, the precise boundaries of the area of interest 28 may change depending on the circumstances and location of the avatar 16B. The virtual environment 10 may use the area of interest 28 to determine which messages or virtual objects 26 within the virtual environment 10 are relevant to the client 22B. For example, the avatar 16B may not be able to view the dragon virtual object 26E due to the distance of the dragon virtual object 26E from the avatar 16B. Since the dragon virtual object 26E is outside of the area of interest 28 of the avatar 16B, the peer 18G may not provide the dragon virtual object 26E or any messages associated with the dragon virtual object 26E to the client 22B.

The area of interest 28 may be determined by the client 22B or by the peer 18G to which the client 22B is connected. Alternately, the determination of the area of interest 28 could be the result of a collaborative message exchange between the client 22B and the peer 18G. The area of interest 28, as shown in FIG. 2, overlaps the regions 12G and 12C. Content virtual objects can be provided from the respective peers 18G and 18C to the client 22B over respective content stream connections 30G and 30C. Each of the clients 22A-22C also has a respective event stream connection 24 with the respective peer 18 hosting the region 12 in which the respective avatar 16 is located. The separation of event stream traffic from content stream traffic is optional and is not necessary to practice the present invention. All data may be sent over the same connection. Where multiple connections are used, each connection is likely a separate logical channel that shares the same physical connection with all other logical connections. According to one embodiment of the present invention, when the client 22B connects to the peer 18G, a prioritized list of virtual objects 26 is created and virtual objects 26 are downloaded to the client 22B in accordance with a download plan generated as a function of the prioritized list. The prioritized list is generally limited to the virtual objects 26 that are within or proximate to the area of interest 28 of the avatar 16B associated with the client 22B; however, depending on a significance or other criteria, one or more virtual objects 26 outside the area of interest 28 of the avatar 16B may be downloaded to the client 22B, if appropriate.

The client 22B may provide the area of interest 28 of the avatar 16B to the peer 18G upon connection with the peer 18G. For purposes of illustration, assume the client 22B has never connected to the peer 18G before, and thus has no information about the region 12G. The peer 18G can determine that the virtual objects 26B and 26C and the avatar 16A are within the area of interest 28 of the avatar 16B. The peer 18G can provide a list of the virtual objects 26B and 26C and the avatar 16A to the client 22B, as well as virtual objects 26 that are not within the area of interest 28 of the avatar 16B but that may be relevant to the avatar 16B because of their significance. The peer 18G can also provide information relevant to prioritizing the download of the virtual objects 26 identified in the list. Such prioritization information can include one or more of the following prioritization criteria:

1. visibility or distance of the respective virtual object 26 to the avatar 16B;
2. estimated time when the respective virtual object 26 will be within the area of interest 28 of the avatar 16B, based on one or both of the current movement path of the respective virtual object 26 and the current movement path of the avatar 16B;
3. a significance criteria of the respective virtual object 26 to the avatar 16B (dangerous or highly valuable objects may have a higher priority);
4. recommendations by the peer 18G based on a past history of interactions between the respective virtual object 26 and other avatars 16;
5. an area of interest 28 of the respective virtual object 26 (for example, where the avatar 16B is within the area of interest 28 of the virtual object 26 even though the virtual object 26 is not within the area of interest 28 of the avatar 16B);
6. if the peer 18G is aware that the client 22B has given a particular type of virtual object 26 a higher priority in the past;
7. a number of instances of a respective virtual object 26 (more instances of a respective virtual object 26, such as the three butterflies associated with the virtual object 26F, may be given a higher priority);
8. a fixed significance criteria (for example, certain virtual objects 26, such as the content virtual objects 26C and 26D, may have a high or maximum priority, since it may be nonsensical to render a non-content virtual object 26 until at least a portion of the landscape has been rendered); or
9. a differentiated priority can be assigned to a composite virtual object 26 (for example, a virtual object 26 consisting of other component virtual objects 26). For example, a house virtual object 26 may consist of multiple virtual objects 26 depicting the outside and the inside of the house. However, unless an avatar 16 enters the house virtual object 26, the virtual objects 26 that depict the interior of the house need not be downloaded.

The prioritization criteria referenced herein are examples only, and the present invention is not limited to those mentioned. The client 22B determines that the area of interest 28 of the avatar 16B also overlaps the region 12C. The client 22B connects to the peer 18C and provides the area of interest 28 to the peer 18C. The peer 18C determines that the avatar 16C, and the virtual objects 26D and 26F, are within the area of interest 28 of the avatar 16B. The peer 18C also determines that a dragon virtual object 26E is located just outside of but proximate to the area of interest 28 of the avatar 16B and, due to the potential significance of the dragon virtual object 26E to the avatar 16B, the peer 18C includes the dragon virtual object 26E in the list of virtual objects 26 provided to the client 22B.

The client 22B receives the list of virtual objects 26 from the peers 18C and 18G and prioritizes the list based on one or more of the prioritization criteria described above. The client 22B may generate a prioritization download plan table that includes data such as an identification of the virtual objects 26, a priority of the virtual objects 26, and a time by which the respective virtual object 26 should be completely downloaded to the client 22B. The client 22B may also generate a download queue table that includes similar information, but on a peer-by-peer basis. The client 22B can initiate the download of multiple virtual objects 26 from the peers 18C and 18G, and can render the virtual objects 26 for the user associated with the client 22B.

For example, a prioritized list of the virtual objects 26 to download may be in the following order according to one embodiment of the present invention:
1. the content virtual object 26C (priority 100), because a content virtual object 26 relates to the landscape associated with the region 12G and has a maximum priority of 100;
2. the virtual object 26B (priority 95), because of its proximity to the avatar 16B;
3. the avatar 16A (priority 90), because the avatar 16A is the closest avatar 16 to the avatar 16B;
4. the avatar 16C (priority 90), because the avatar 16C coincidentally is in the same social network as the avatar 16B;
5. the virtual object 26D (priority 80), because the avatar 16B is near the region 12C;
6. the virtual object 26F (priority 75), because the virtual object 26F has multiple instances; and
7. the virtual object 26E (priority 50), because, while distant, the virtual object 26E is potentially dangerous to the avatar 16B.

Figure 3:
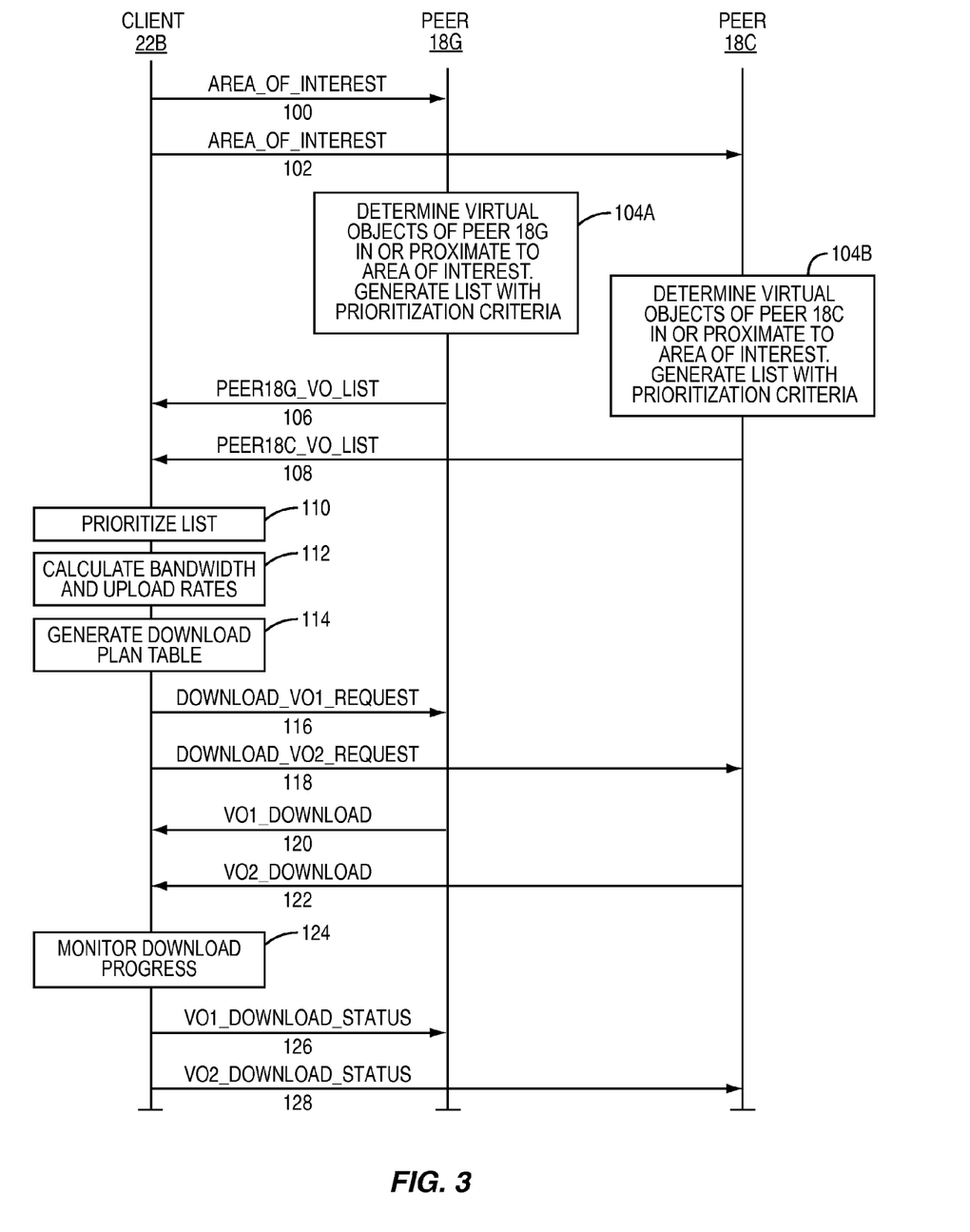
FIG. 3 is a message flow diagram illustrating message flows suitable for prioritizing virtual object downloads according to one embodiment of the present invention.

FIG. 3 is a message flow diagram illustrating message flows suitable for prioritizing virtual object downloads according to one embodiment of the present invention. The client 22B determines that an area of interest 28 of the avatar 16B associated with the client 22B encompasses the peers 18G and 18C, and provides the area of interest 28 to the peer 18G and to the peer 18C (steps 100 and 102). The peer 18G uses the area of interest 28 to determine which virtual objects 26 in the region 12G are within or proximate to the area of interest 28. The peer 18G generates a list identifying such virtual objects 26 and provides prioritization criteria for each virtual object 26 in the list (step 104A). The peer 18C follows a similar process with respect to virtual objects 26 in the region 12C in or proximate to the area of interest 28 (step 104B). The peer 18G communicates to the client 22B the virtual object list (VO_LIST) associated with the peer 18G (step 106), and the peer 18C communicates to the client 22B the virtual object list associated with the peer 18C (step 108). The client 22B can consolidate the virtual object lists from the peers 18G and 18C, use the prioritization criteria provided by the peers 18G and 18C and any other prioritization criteria known to the client 22B, and generate a prioritized list of virtual objects 26 for downloading to the client 22B (step 110). In an alternate embodiment, the peers 18G and 18C can prioritize the virtual object lists, and provide the prioritized virtual object lists to the client 22B. In yet another embodiment, in a situation where, as described herein, the area of interest 28 overlaps multiple peers 18, one peer 18 can receive prioritized virtual object lists, consolidate the lists into a single prioritized virtual object list, and provide the consolidated list to the client 22B.

The client 22B calculates an available bandwidth associated with the client 22B, and reserves a portion of the available bandwidth for event traffic (step 112). The available bandwidth is typically determined as a function of bandwidth of the network to which the client 22B is connected. Mechanisms for determining available bandwidth are known to those skilled in the art and will not be discussed in detail herein. The client 22B can generate a download plan table containing the consolidated list of virtual objects 26 in a prioritized order (step 114). The client 22B can use the download plan table to determine which virtual objects 26 should be transferred from which peers 18 and in what order. The client 22B initiates a download virtual object request (DOWNLOAD_VO_REQUEST) to the peers 18G and 18C (steps 116 and 118). The peers 18G and 18C then initiate downloads of the requested virtual objects 26 (VO_DOWNLOAD) to the client 22B (steps 120 and 122). The client 22B monitors the download progress of the virtual objects 26 (step 124), and periodically provides download status messages (VO_DOWNLOAD_STATUS) to the peers 18G and 18C (steps 126 and 128). The peers 18G and 18C can use the download status messages to alter the transfer rate of the virtual objects 26 as appropriate.

Figure 4:
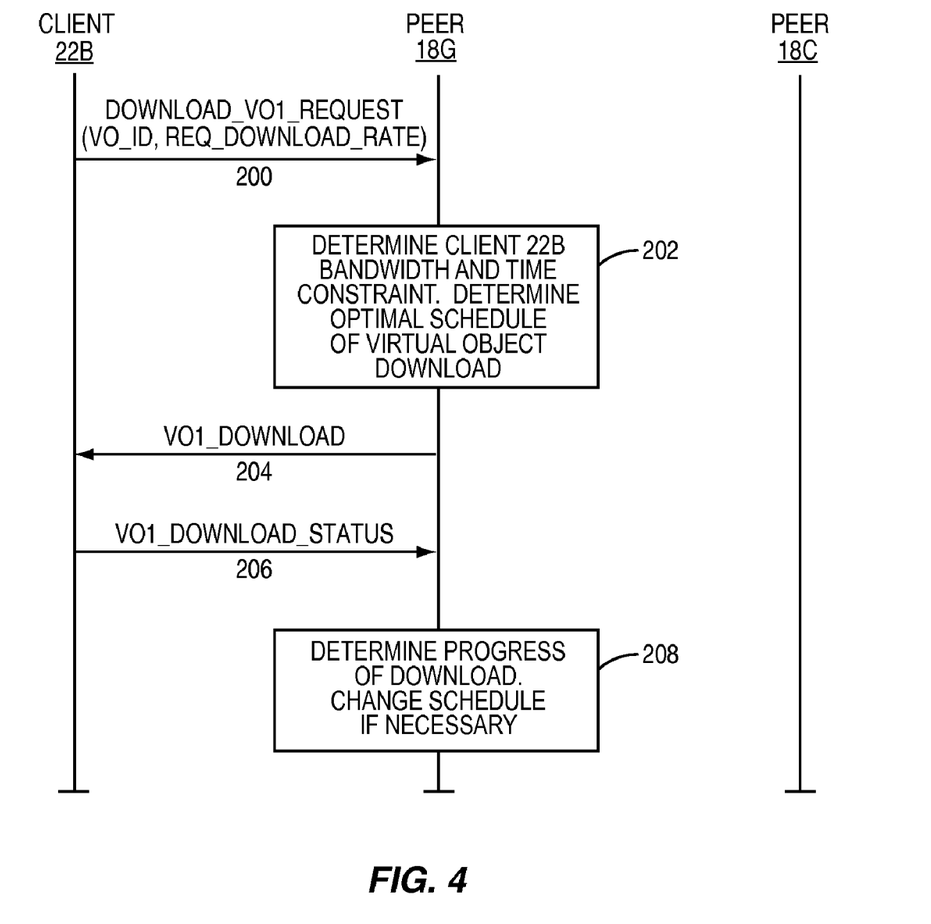
FIG. 4 is a message flow diagram illustrating certain aspects of the message flow diagram shown in FIG. 3 in greater detail.

FIG. 4 is a message flow diagram illustrating certain aspects of the message flow diagram shown in FIG. 3 in greater detail, and specifically illustrates in greater detail functionality associated with the peer 18G upon receiving a request to download a virtual object 26. The client 22B sends a download virtual object request to the peer 18G (step 200). The download virtual object request can include a virtual object identifier (VO_ID) and additional information, such as a required download rate (REQ_DOWNLOAD_RATE), or a required time of arrival of the virtual object 26 associated with the virtual object identifier associated with the client 22B. The peer 18G can determine the bandwidth associated with the client 22B and, using one or both of the provided download rate and the required time of arrival, can determine an optimal schedule for downloading the virtual object 26 to the client 22B (step 202). The schedule can include information including size and frequency of packets to ensure that the virtual object 26 arrives at the client 22B ahead of the required time of arrival. The peer 18G begins the virtual object 26 download (step 204). The client 22B can periodically provide a virtual object 26 download status to the peer 18G (step 206). The peer 18G obtains the virtual object 26 download status and can determine if the progress of the virtual object 26 download is consistent with providing the virtual object 26 in advance of the time that the virtual object 26 is required to be downloaded to the client 22B. If it is determined that the progress is not consistent with providing the virtual object 26 in advance of the time that the virtual object 26 is required to be downloaded to the client 22B, then the peer 18G can change the download schedule to increase the packet size or the number of messages transferred within a given period of time as required to ensure that the virtual object 26 will be downloaded to the client 22B in the appropriate time frame (step 208).

Figure 5:
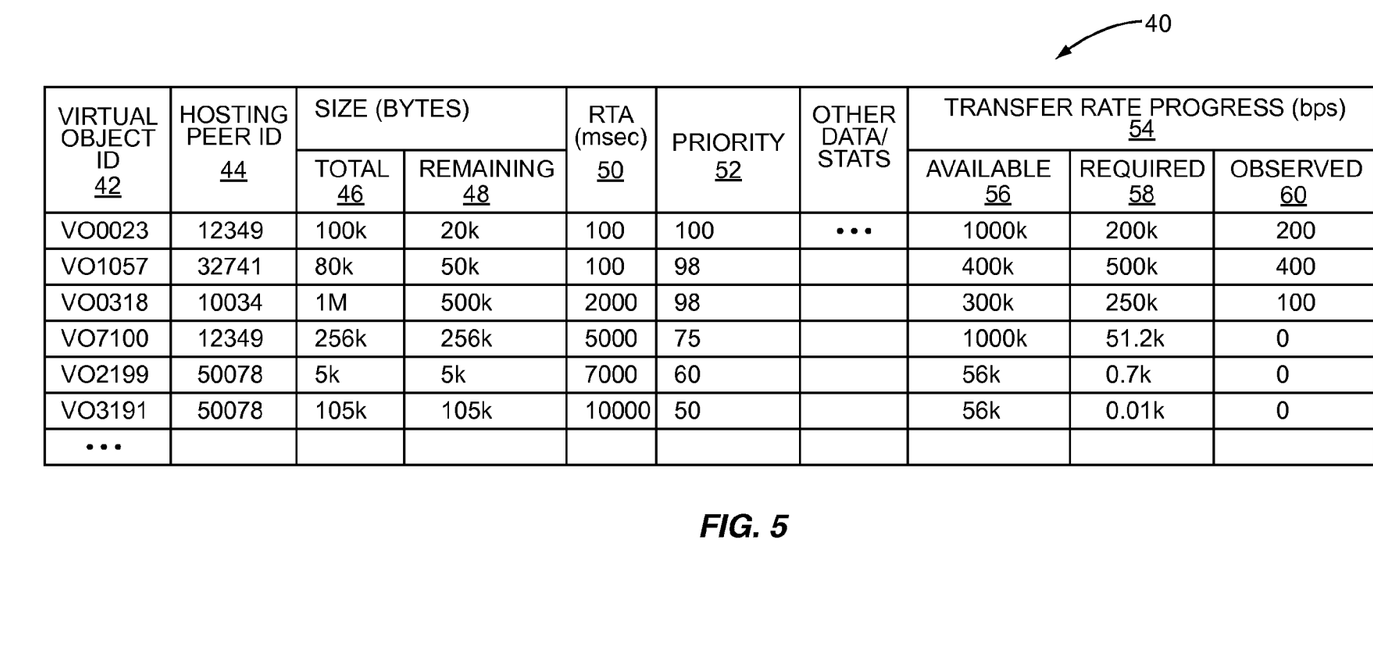
FIG. 5 is a download plan table according to one embodiment of the present invention.

FIG. 5 is a download plan table 40 according to one embodiment of the present invention. The download plan table 40 is typically assembled by a client 22 but, according to another embodiment of the present invention, the download plan table 40 can be assembled by a peer 18 and provided to the client 22. The download plan table 40 can include data fields such as a Virtual Object ID field 42 identifying virtual objects 26 by internal identifiers known to the virtual environment 10. A Hosting Peer ID field 44 can identify the respective peer 18 that contains the respective virtual object 26. A Total Size field 46 can indicate the size of the respective virtual object 26. A Remaining Size field 48 can indicate the amount of the respective virtual object 26 that remains to be downloaded to the client 22. A Required Time of Arrival (RTA) field 50 can indicate a time by which the respective virtual object 26 must be downloaded to the client 22. The RTA field 50 can be determined by mechanisms known to those skilled in the art including, for example, dead reckoning. A Priority field 52 can indicate the prioritization assigned to the respective virtual object 26. A Transfer Rate Progress field 54 can include subfields such as an Available field 56 indicating a total upload bandwidth available from the respective peer 18 for the respective client 22. A Required field 58 indicates a bandwidth determined by the client 22 that is necessary to meet the time of arrival value in the RTA field 50. An Observed field 60 indicates that actual observed transfer rate.

Figure 6:
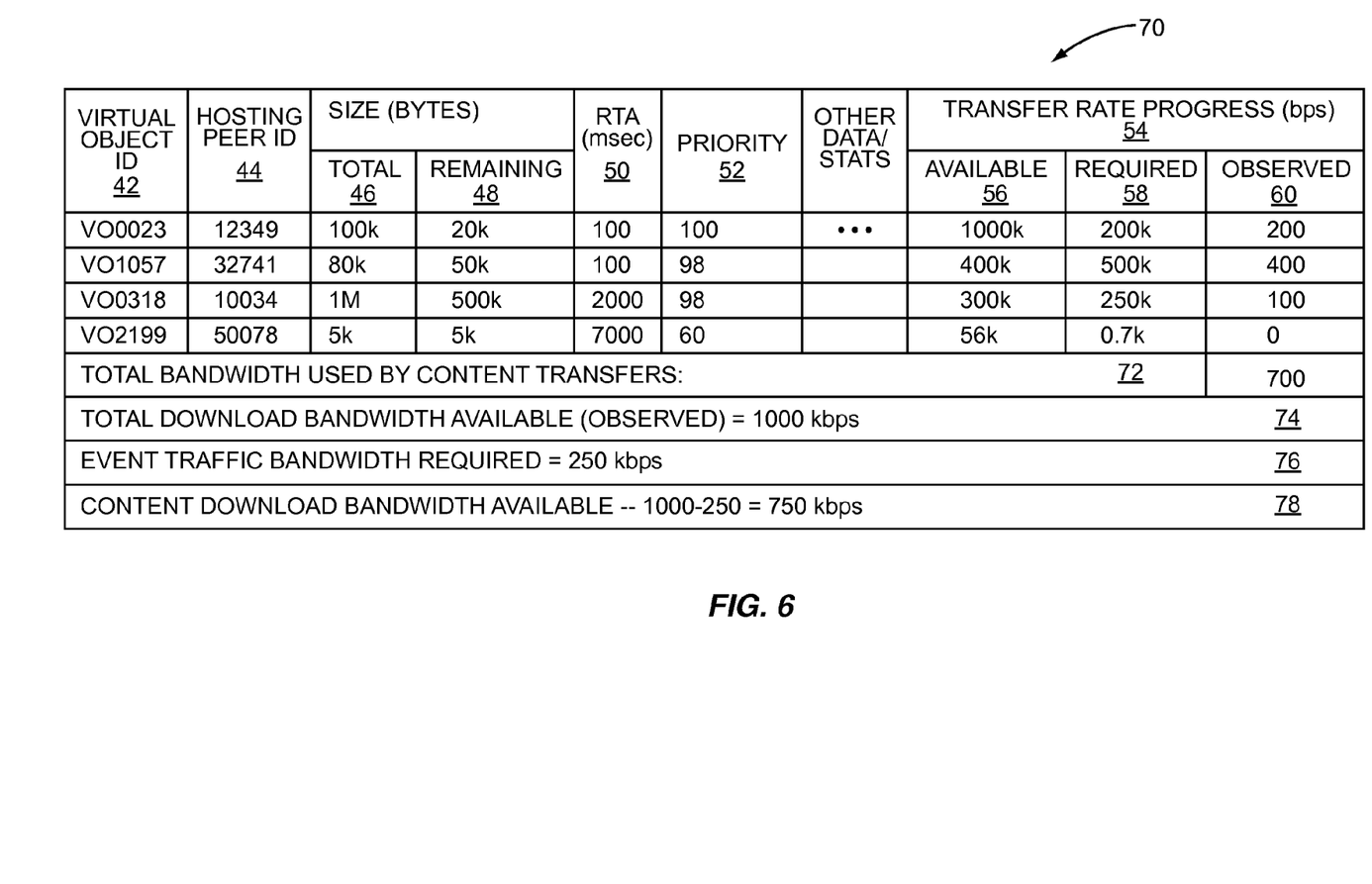
FIG. 6 is a download queue table according to one embodiment of the present invention.

FIG. 6 is a download queue table 70 that may be generated by a client 22 according to one embodiment of the present invention. The download queue table 70 contains many of the same fields as the download plan table 40 illustrated in FIG. 5. However, the download queue table 70 contains a single row for each separate peer 18 that has a virtual object 26 that needs to be downloaded to the client 22. In addition to the fields discussed above with respect to the download plan table 40, the download queue table 70 can include a Total Bandwidth field 72. The Total Bandwidth field 72 identifies the total client 22 bandwidth being used for the concurrent download of virtual objects 26 from the peers 18 that are downloading virtual objects 26 to the client 22. The download queue table 70 can also include a Total Download Bandwidth Available field 74 indicating the total download bandwidth available to the client 22. An Event Traffic Bandwidth Required field 76 identifies the amount of bandwidth that must be reserved for event traffic. A Content Download Bandwidth Available field 78 can indicate a difference between the Total Download Bandwidth Available field 74 and the Event Traffic Bandwidth Required field 76, identifying that bandwidth which is available for downloads of virtual objects 26. According to one embodiment of the present invention, the client 22 preferably initiates concurrent downloads so long as the cumulative rate of the individual virtual object 26 downloads remains less than the content download bandwidth available. As will be appreciated by those skilled in the art, the apportionment of total download bandwidth between the Event Traffic Bandwidth Required field 76 and the Content Download Bandwidth Available field 78 can change as appropriate depending on the circumstances of the avatar 16 associated with the client 22. For example, if the avatar 16 is in a region 12 of the virtual environment 10 where there are few or no other virtual objects 26, it may be appropriate to reduce the amount of bandwidth apportioned to the Event Traffic Bandwidth Required field 76 and increase the amount of bandwidth apportioned to the Content Download Bandwidth Available field 78.

Figure 7:
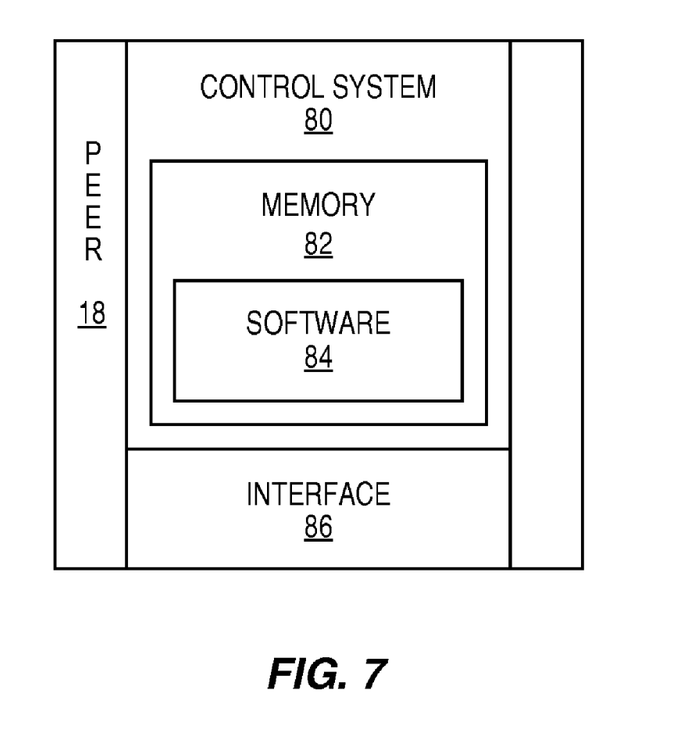
FIG. 7 is a block diagram illustrating components of a peer according to one embodiment of the present invention.

FIG. 7 is a block diagram illustrating components of a peer 18 according to one embodiment of the present invention. A control system 80 includes a memory 82 that contains software 84 suitable for implementing the functionality described herein. An interface 86 is capable of communicating over a network with other peers 18 and clients 22, as appropriate.

Figure 8:
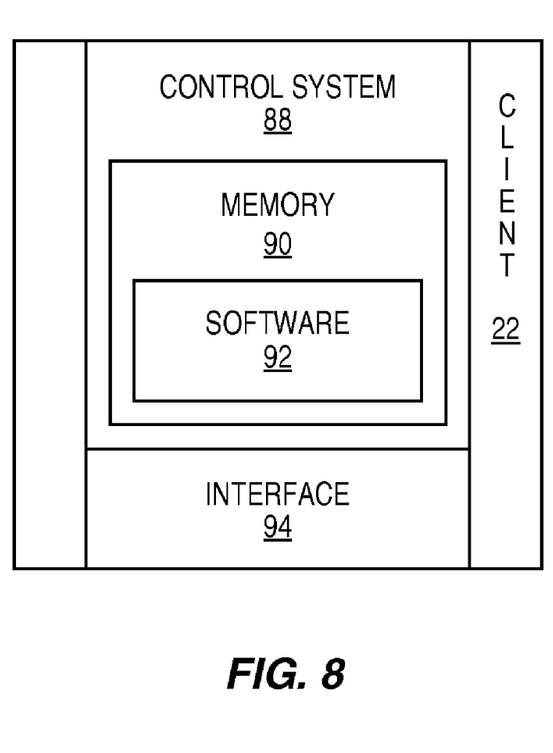
FIG. 8 is a block diagram illustrating components of a client according to one embodiment of the present invention.

FIG. 8 is a block diagram illustrating components of a client 22 according to one embodiment of the present invention. A control system 88 includes a memory 90 that contains software 92 suitable for implementing the functionality described herein. An interface 94 is adapted to communicate with peers 18 and clients 22 over a network, as appropriate.

While for purposes of illustration the invention has been described herein with reference to prioritizing downloads based on an area of interest 28 associated with an avatar 16, it will be apparent to those skilled in the art that the prioritization of virtual objects can also apply to other types of virtual objects that may have associated areas of interest, such as virtual objects that are controlled by artificial intelligence modules of one or more peers 18, such as virtual object cats, or horses, as may be appropriate for a particular virtual environment.

Those skilled in the art will recognize improvements and modifications to the preferred embodiments of the present invention. All such improvements and modifications are considered within the scope of the concepts disclosed herein and the claims that follow.

What is claimed is:
1. A method for downloading virtual objects comprising:
providing a first virtual object comprising an avatar in a virtual environment hosted by a plurality of peers, the virtual environment comprising one or more regions about which the avatar is capable of roaming;
determining an area of interest of the first virtual object;
determining a plurality of second virtual objects based on the area of interest; and
initiating a download of at least two of the plurality of second virtual objects based on a prioritized list of the plurality of second virtual objects that prioritizes a download order of the plurality of second virtual objects.

2. The method of claim 1 wherein the prioritized list is based on at least one of:
- a distance of each of the plurality of second virtual objects from the first virtual object;
- a significance criteria associated with each of the plurality of second virtual objects;
- an area of interest of each of the plurality of second virtual objects; and
- an estimated time of visibility of the plurality of second virtual objects by the first virtual object.

3. The method of claim 1 wherein each of the plurality of peers hosts a region in the virtual environment, and wherein the first virtual object is associated with a client, further comprising connecting to one of the plurality of peers by the client, wherein the client has no data relating to the region hosted by each of the plurality of peers prior to connecting to the one of the plurality of peers.

4. The method of claim 1 wherein the first virtual object is associated with a client, and wherein initiating the download of the at least two of the plurality of second virtual objects based on the prioritized list of the plurality of second virtual objects comprises determining an available download rate associated with the client, determining a minimum transfer rate of each of the at least two of the plurality of second virtual objects, determining that the available download rate equals or exceeds a sum of the minimum transfer rate of each of the at least two of the plurality of second virtual objects, and initiating the download of the at least two of the plurality of second virtual objects.

5. The method of claim 1 wherein each of the plurality of peers hosts a region in the virtual environment, and wherein the first virtual object is associated with a client, and wherein each of the at least two of the plurality of second virtual objects is downloaded from a different one of the plurality of peers.

6. The method of claim 1 wherein the first virtual object is associated with a client, and wherein the prioritized list is created by the client.

7. The method of claim 1 wherein the first virtual object is associated with a client that is connected to one of the plurality of peers, and wherein the prioritized list is created by the one of the plurality of peers.

8. The method of claim 1 wherein the first virtual object is associated with a client that is connected to one of the plurality of peers, and wherein the prioritized list is created by the client based at least in part on information provided by the one of the plurality of peers.

9. The method of claim 1 wherein the first virtual object is associated with a client that is connected to one of the plurality of peers, and wherein the area of interest is determined by the client.

10. The method of claim 1 wherein the first virtual object is associated with a client that is connected to one of the plurality of peers, and wherein the area of interest is determined by the one of the plurality of peers.

11. The method of claim 1 further comprising altering the prioritized list of the plurality of second virtual objects based on an actual download rate of one of the at least two of the plurality of second virtual objects.

12. The method of claim 1 wherein each of the plurality of peers hosts a region in the virtual environment, and wherein the first virtual object is associated with a client, further comprising receiving, by one of the plurality of peers, a request by the client to download one of the at least two of the plurality of second virtual objects, wherein the request includes a time by which the one of the at least two of the plurality of second virtual objects should be completely downloaded to the client, determining a size of the one of the at least two of the plurality of second virtual objects, determining a download schedule based on the size of the one of the at least two of the plurality of second virtual objects and the time by which the one of the at least two of the plurality of second virtual objects should be completely downloaded to the client, and initiating the download of the one of the at least two of the plurality of second virtual objects based on the download schedule.

13. The method of claim 12 wherein the download schedule includes message size data and message frequency data.

14. The method of claim 1 further comprising generating the prioritized list of the plurality of second virtual objects that prioritizes the download order of the plurality of second virtual objects by ordering the plurality of second virtual objects based on the area of interest in an order based on at least one of a distance of each of the plurality of second virtual objects from the first virtual object, a significance criteria associated with each of the plurality of second virtual objects, an area of interest of each of the plurality of second virtual objects, and an estimated time of visibility of the plurality of second virtual objects by the first virtual object.

15. A method for downloading a plurality of second virtual objects comprising:
- providing, by a first peer, a first region of a virtual environment being hosted by a plurality of peers, the virtual environment comprising an environment about which an avatar is capable of roaming;
- connecting with a client having an associated first virtual object which comprises the avatar;
- determining an area of interest of the first virtual object;
- determining the plurality of second virtual objects based on the area of interest; and
- initiating a download of at least two of the plurality of second virtual objects based on a prioritized list of the plurality of second virtual objects that prioritizes a download order of the plurality of second virtual objects.

16. The method of claim 15 wherein the prioritized list is based on at least two of:
- a distance of each of the plurality of second virtual objects from the first virtual object;
- a significance criteria associated with each of the plurality of second virtual objects;
- an area of interest of each of the plurality of second virtual objects; and
- an estimated time of visibility of the plurality of second virtual objects by the first virtual object.

17. The method of claim 15 wherein the client has no data relating to the first region prior to connecting to the first peer.

18. The method of claim 15 wherein initiating the download of the at least two of the plurality of second virtual objects based on the prioritized list of the plurality of second virtual objects comprises determining an available download rate associated with the client, determining a minimum transfer rate of each of the at least two of the plurality of second virtual objects, determining that the available download rate equals or exceeds a sum of the minimum transfer rate of each of the at least two of the plurality of second virtual objects, and initiating the download of the at least two of the plurality of second virtual objects.

19. The method of claim 15 wherein each of the plurality of peers hosts a separate region in the virtual environment that is different from the first region, and wherein a first of the at least two of the plurality of second virtual objects is downloaded from the first peer and a second of the at least two of the plurality of second virtual objects is downloaded from one of the plurality of peers other than the first peer.

20. An apparatus comprising:

an interface adapted to communicate with a network; and a control system adapted to:

provide a region in a virtual environment hosted by a plurality of peers, the virtual environment comprising an environment about which an avatar is capable of roaming;

connect with a client having an associated first virtual object which comprises the avatar;

determine an area of interest of the first virtual object;

determine a plurality of second virtual objects based on the area of interest; and     initiate a download of at least two of the plurality of second virtual objects based on a prioritized list of the plurality of second virtual objects that prioritizes a download order of the plurality of second virtual objects.

21. The apparatus of claim 20 wherein the prioritized list is based on at least two of:

a distance of each of the plurality of second virtual objects from the first virtual object;

a significance criteria associated with each of the plurality of second virtual objects;

an area of interest of each of the plurality of second virtual objects; and     an estimated time of visibility of the plurality of second virtual objects by the first virtual object.

22. The apparatus of claim 20 wherein the client has no data relating to the region prior to connecting to the apparatus.

* * * * *